United States Patent Office 3,086,875
Patented Apr. 23, 1963

3,086,875
CELLULOSIC ADDITIVE MATERIALS FOR GREEN SAND MOLDING
Burgess P. Wallace, Brooklyn, and Ronald E. Melcher, Cambria Heights, N.Y., assignors to Whitehead Brothers Company, New York, N.Y., a corporation of New Jersey
No Drawing. Filed May 29, 1961, Ser. No. 113,073
6 Claims. (Cl. 106—38.5)

This invention relates to additives for silica base green molding sands and more particularly relates to an improved additive for green molding sand compositions.

In our co-pending application Ser. No. 97,386 we pointed out that the metal casting art had a serious problem with respect to the number of rejects obtained when using the customary expansion stopping additive materials. We particularly referred to cellulosics, including hard and soft wood flour, ground corn cobs, flour flaxseed hulls and the like which have been used. We pointed out that the theory behind incorporating such materials in green molding sands was that, on their being burned out, sufficient voids were created within the molding sand itself to permit expansion of the silica grains without causing rupture of the surface of the molds. The amounts of such materials that are used are designed to provide sufficient void space in order to balance the net total expansion of the sand, thereby relieving the forces which had resulted in rupture or separation of the mold. One of the disadvantages of the cellulosics is that the large volume of gas, produced when a sufficient amount of cellulosic material is employed, often leads to other types of surface defects.

We have now found, however, that by carefully selecting the proportions of cellulosic material to be added and also including in the additive material an amount of a material selected from the group consisting of starches, modified starches and starch derivatives which form gel structures in the presence of steam and hot water, that direct benefits can be obtained. One of the principal benefits is that the additive material described and claimed in our copending application Ser. No. 97,386, which is a relatively expensive material, can be admixed with the very inexpensive cellulosic described hereinbelow, thus producing a material which is as effective as the additive of said patent application, but is considerably less expensive.

The principal object of this invention, therefore, is to provide an additive consisting of a mixture of from 20% to 50% of a material selected from the group consisting of starches, modified starches and starch derivatives along with the remaining percentage being a cellulosic material which has been specially treated.

The mechanism which produces the surface defects is known as "rattails," "buckles" and "scabs," is described in our copending application Ser. No. 97,386. It is well known that molten metal, when poured into green sand molds causes severe thermal expansion of the silica grains. The green molding sand, since its principal ingredient is silica sand grains bonded together by clay, includes a sufficient amount of temper water to give the mold its proper strength. The heating of the sand grains by the incoming metal may be either by direct contact or by radiation. The rate and degree of heating depends upon the proximity of the sand itself to the metal and the heat transfer conditions which prevail in the mold. As the molten metal causes a rise in temperature within the mold, the boiling point of the temper water is quickly reached. The temperature will stay at that point or level off until all the free water present is boiled off as steam or is driven away from the surface of the mold.

As soon as the last of the free water has been boiled away or driven away, the temperature again rises to a point dependent upon the temperature of the metal and the location of the sand mass from the source of heat, considering the conditions of heat transfer present. The heating and dehydration of the sand, particularly where all the water is boiled away, causes the sand to become an integral mass in which each grain of sand is held to its neighbor by a dry clay bond. The heating of this integrated mass of sand and dry clay causes the mass to expand as a unit. The net effect of the expansion of this unit is that stresses are created between the dry mass near the surface of the mold and the green or undehydrated and unheated sand at some distance from the surface of the mold.

The process of dehydration results in the transport of water as steam through the sand mass in a direction normal to the isotherms developed in the mold. The water will exist as steam as it travels until it reaches the 212° F. isotherm, at which point it will again condense to liquid water. This creates at or very near the 212° F. isotherm a vastly increased moisture content in the sand. This causes the bonding strength of the clay to be materially lessened since clay which is wetted above its temper point loses strength inversely with its water content and as is well known will lose all of its bonding ability and slump if a certain concentration of water is exceeded. Furthermore, clay also loses its bonding strength when in the presence of hot water. Thus, as long as the temperature of the water being driven by the molten metal is above 140° it will virtually eliminate the bonding ability of the clay since nearly all of its bonding strength will be quickly lost.

The resulting loss of bonding strength of clay and the concentration of water at or about the 212° isotherm renders the mold incapable of resisting the stresses imposed by the expanding heated, dehydrated sand mass near the surface. This means that a rupture or separation between the two must occur. As was pointed out in application Ser. No. 97,386, a close study of the relationship of expansion of the heated crust with respect to the unheated mass of green sand indicates that the mode of failure is shear, occurring normally at the dividing line between the dry and the over-wetted sand.

Depending upon the location of the various types of failures described in our copending application, various well known surface defects such as "rattails," "buckles" and "scabs" result.

It is well known in the art that cellulosic materials such as finely ground hard and soft wood flours, finely ground solid residue from the distillation of furfural alcohol, and/or finely ground corn cobs, wheat hulls, flaxseed hulls and the like can be used for the express purpose of relieving or minimizing the effect of the thermal expansion of green sand. The action of these cellulosic materials has been presumed to be that described above. However, they are known to create difficulties such as those described below.

All are mild absorbers of water and all burn out at a relatively low temperature. When these cellulosic materials are admixed with molding sand these two functions are going on simultaneously and may effect some reduction in surface defects, but by no means are surface defects eliminated in all cases. In fact, it is impossible to put enough of any of the cellulosic materials into a molding sand in order to stop serious surface defects from occurring because the mere addition of such large quantities of cellulosic material to the molding sands produces a molding sand which cannot practically be used for making green sand molds.

The reason for this latter difficulty is that the cellulosic materials absorb water at room temperature. They immediately rob the bonding clay in the molding sand of its temper water, making the sand feel mealy and dry. This is a very serious drawback because it makes the sand fragile and unable to withstand pattern withdrawal or any disturbance of the surface. The bond between the sand grains which is relied upon is the clay bond and since this clay is robbed of its plasticizing action because of its loss of water, the clay is no longer able to hold the sand grains together and an easily eroded surface is produced.

Insofar as the action of the cellulosic materials being burned out is concerned, this indeed happens but to choose the precise amount required to provide enough voids for the silica grains to have enough freedom to expand is exceedingly difficult and, as has been pointed out above, is often impossible without seriously affecting the properties of the molding sand.

Our investigation led us to the fact that the water absorptive ability of cellulosics, for example wood flour, is very detrimental because it takes place at room temperature. Thus at the time in the molding process when the water absorptive properties of the wood flour or other cellulosic is needed, the material has already become saturated and is no longer able to absorb more water when the steam condenses near it.

We also found that "rattails," "scabs" or "buckles" formed on the surface of the casting long before the cellulosic material has burned out or has been consumed.

High speed motion picture photography was used to study the mechanism of mold failure and has given us ample evidence to the fact that the moment the hot metal hits the surface of the mold the sand is expanded and the break in the sand surface occurs forming a rattail in an almost immeasurably short time. Certainly the time period is so short that it occurs too rapidly for the wood flour to be burned up to an ash and to be driven off as carbon dioxide. Visual observation of high speed motion picture photographic studies of the process of pouring a ferrous metal into a green sand mold provides complete proof that the burned out theory of wood flour is erroneous and can be discarded. The photography shows that the "rattail," or break in the surface of the mold, forms immediately on its being contacted by the hot metal which allows no time for the saturated particles of wood flour to drive off the water they contain and then to be consumed by combustion.

Our investigations have led us to the conclusion that wood flour and similar cellulosic materials can be vastly improved if they are subjected to the following process.

To begin with the wood flour or other cellulosic material must be so treated that its action of absorbing water at room temperature is very materially reduced. Secondly, the wood flour must be so treated that its water absorbing ability at the temperature of steam is vastly increased. Furthermore, it is necessary to use a bonding material as a part of the additive which includes the cellulosic material so that such bonding material can act along with the clay bond to give it sufficient strength to render the green sand mold rigid at the time when the expansion is taking place due to the influx of the hot metal.

Our investigations revealed that commonly employed cellulosics, such as wood flour particles, should be given a surface treatment with a high viscosity, waterproof wax or petrolatum so that the wood flour or other cellulosic material is substantially waterproof at room temperature. To produce the modified wood flour which is substantially waterproof at room temperature the material is subjected to a fog spray of hot petrolatum while at the same time being subjected to agitation. The temperature of the wood flour is kept low so that the petrolatum condenses on the surface of the wood flour particles in the form of minute droplets which are smeared completely around the surface of the particles by the agitating action. This condensation then produces a thin, sticky film of petrolatum on each wood flour particle. The film of petrolatum on the wood flour particles should not penetrate the wood flour particles and absorption of the petrolatum by the wood flour should not be apparent.

The wood flour or other cellulosic which has been so treated now is substantially water-repellant and if a quantity were to be placed in a beaker it is easily seen that the material, when compared to an untreated sample, neither absorbs water nor is miscible with it.

Following this spray treatment the treated wood flour, or other cellulosic, is then introduced into a mixer into which is also placed ordinary powdered corn or potato starch, or one of the modified starches or starch derivatives described in our copending application. These materials are subjected to agitation until a homogeneous admixture is obtained. The mixed materials are then fed through a micro-pulverizer to break up any small agglomerates which may have formed. Once this latter step is completed the material is ready for bagging or other packaging for shipment.

A method of preparing the material of this invention is as follows: 1000 pounds finely ground wood flour, either soft or hard wood, is introduced into a ribbon type blender where it is treated to a 100 pound fog spray of hot petrolatum having the following approximate composition.

Specific gravity at 60° F. _____ 0.8.
Flash point COC in ° F. _____ 490.
Melting point in ° F. _____ Between 120 and 139.
Viscosity at 210° F. SSU _____ 40–50.
Penetration at 77° F. _____ 35–50.

In spraying the petrolatum it must first be a completely molten liquid and then forced through spray nozzles which transform it into a very fine fog. The fog is sprayed directly into the area over the wood flour which is kept in agitation. As the fog of petrolatum cools in the air directly above the mixer, it condenses and settles on the wood flour particles in the form of extremely small droplets which immediately attach themselves to the particles of wood flour. The agitating action of the mixer is such that each particle of wood flour is surface-coated by smearing these droplets around the particle. There is no penetration since the viscosity of the material in its cold state is sufficiently high so as to prevent any penetration of the petrolatum into the wood flour.

The wood floor, whose weight has been increased approximately 10% by the weight of the petrolatum added, is, following the spray treatment, now introduced into a mixer along with 1000 pounds of ordinary powdered corn or potato starch, or a cross-linked or cross-bonded starch or sodium salt of ungelatinized low substituted starch acid esters containing carboxyl and sulfonic groups is added to the wood flour by continuous agitation. The agitation is continued until a homogeneous mixture is obtained.

The treated wood flour and starch mixture is then put through pulverizing equipment in order to break up any agglomerates which may have formed and the material is then ready for packaging and shipping.

One of the advantages of surface treating the wood flour with petrolatum resides in the fact that the surface of the wood flour particles become slightly tacky and when admixed with the starches or starch derivatives the starches or starch derivatives tend to adhere to this sticky film. This increases the waterproofing action because it is now apparent that the wood flour particle's surface is water repellant and the starch derivative particles which are stuck to the film on the surface of the wood particles are also water resistant at room temperatures. Thus neither of the two materials absorb the temper water of the clay at normal working temperatures before metal is poured into molds including the additive material of this invention.

We have found that the mixture of our improved wood flour and the starch materials when added to green molding sands in percentages from about 1/10 of 1% to about 2% completely eliminates the surface defects of "rattails," "buckles" and "scabs," even under the worst molding conditions.

We believe that the action which results is as follows. Since the expansion stopping additive of this invention is water repellant, the molding sand is in no way affected by incorporation into it of the material of this invention. In other words, the molding sand stays moldable, stays moist and is in no way embrittled by the additive just described. In fact, the molding sand shows increased moldability since the starch materials are responsible for increased amounts of slip in the sand. The starch particles being slightly spherical in form act somewhat in the nature of small ball bearings between the sand grains giving a very definite increase in flowability and producing a denser and tighter mold for the same amount of ramming energy.

As soon as molten metal is poured into the molds including the additive of this invention, the high concentration of water moving away from the mold-molten metal interface starts to be absorbed by the wood flour which will receive some water at this temperature since the wax or petrolatum film on the wood flour particles is absorbed into the wood flour particles along with the water. In other words, the waterproof film on the wood flour is removed due to the heat rendering the wax film less viscous, or in other words making it fluid, causing the petrolatum or wax to be absorbed into the wood particle. Simultaneously, the excess water passes into the wood flour and some of the excess water acts on the starch particles to form a gel structure. The starch particles, of course, as is described in our copending application, are not affected by cold water but ony form gels in hot water. Thus both the starch particles, in forming a gel, and the wood flour, in absorbing some of the water, prevent the clay from being robbed of water and therefore rendering it weak in bonding strength. Also, the strong adhesive gel spreads throughout the clay bonded sand mass and as the temperature exceeds the gel temperature of the starch component, the gel stiffens to a hard cementing film which assists the clay in preventing the sand mass from rupturing.

Of course, as the temperature of the sand mass continues to rise, the wood particles will be dried out and eventually consumed so that some expansion of the sand grains within the void spaces created thereby will be possible. However, this is a secondary effect since the critical point in time is very shortly after the metal is poured. During this critical time, both components of the additive of this invention act together to insure that the sand mass will not rupture or separate. This, of course, assures that surface defects caused by said separation or rupturing will be eliminated.

For best results, the wood flour or cellulosic material which is used to make up the additive of this invention should be resistant to water absorption at any temperature less than 140° F. However, at temperatures above 140° F. the cellulosic material should readily absorb water. The surface of the particles of cellulosic materials should have a substantially homogeneous coating of starch granules which starch is either in the raw starch form or is a cross-linked chemically bonded starch, or is a chemically treated starch of the nature of sodium salts of ungelatinized, low substituted starch acid esters containing carboxyl and sulfonic groups.

Some examples of typical mixtures for the additive material of this invention are as follows:

*Example #1*

100 lbs. of cellulosic material (hard wood flour such as maple flour or oak; soft wood flour such as slash pine or white wood).

5 lbs. of petroleum hydrocarbon wax such as specified in the above. (This, of course, is to be sprayed on the wood flour in the form of a fog.)

100 lbs. of sodium salts of ungelatinized low substituted starch acid ester derivatives containing sulfonic acid and carboxylic groups.

This example represents the top limit or maximum concentration of both materials which we feel would be desirable. Thus, the materials are in a 50–50 relationship.

*Example #2*

80 lbs. of cellulosic material, finely ground (such as hard and soft wood flours, ground flaxseed hulls, ground residue from corn cob furfural alcohol distillation or other high concentration cellulosic materials).

5 lbs. of petroleum wax (same as mentioned above and applied as described above).

20 lbs. of a 50/50 mixture of sodium salts of ungelatinized low substituted starch acid ester derivatives containing sulfonic and carboxylic groups and a chemically cross-linked or cross-bonded corn starch.

Example #2 is illustrative of the maximum amount of wood flour which should be combined with the starch derivative. Thus 80% of the mixture is made up of wood flour and 20% is made up of the mixture modified starches and starch derivatives described in our copending application. The 20% figure for the starch materials is about as low as should be used, since any starch concentration less than 20% will be so small as to not have any practical effect. We have found that below the 20% concentration for the starch materials, the additive acts simply as wood flour would by itself. On the other hand, up to 50% of the mixture, as is illustrated in Example #1, can be the starch material, leaving 50% for the cellulosic material. Example #1 is an indication of about the minimum amount of cellulosic material that should be employed. If less cellulosic is employed the starch component essentially acts alone.

Of course there is a wide range of combinations of materials which would be suggested to any one skilled in the art between the concentrations given in Example #1 and Example #2. Any of these will work and with a particular molding problem one may work slightly better than the others. However, as we have indicated above, when an additive of this invention is used in an amount within the range of about 1/10 of 1% to about 2% of the total weight of the molding sand mixture we have found that common surface defects are substantially eliminated.

Three examples of molding sand compositions employing the additive of this invention are set forth below.

*Example #3*

2000 lbs. S.F.A. fineness #70 unbonded washed and dried silica sand
100 lbs. southern bentonite—alkaline type (pH 8.7)
84 lbs. water
11 lbs. wood flour-chemical starch additive as shown above in Examples #1 and #2.

It does not matter in what order the components are put together, but it is usual to incorporate all the dry powders, namely the sand, bentonite and wood flour composition, and mix these in a muller for approximately 3 minutes in the dry state, and then add the water and mull for another 3 minutes.

*Example #4*

2000 lbs. A.F.S. fineness #130 unbonded washed and dried silica sand
140 lbs. acid-type southern bentonite (pH 4.7)
85 lbs. water
21 lbs. wood flour-chemical starch additive, described above.

Same procedure is followed in mixing as given in Example #3.

Example #5

2000 lbs. naturally bonded molding sand with a clay content of between 10% and 15%
160 lbs. water
42 lbs. wood flour-chemical starch additive, described above.

It will be noted that in the case of Example #5 the additive material was raised to about 2% by weight in order to take into account the fact that larger clay amounts normally present in such sands have to be balanced with more than expansion stopping additive material. The other examples merely indicate typical green molding sand compositions which employ the additive material of this invention.

The results obtained by using the molding sand compositions of this invention, including the additive materials of this invention, are truly surprising. Surface defects which have been a serious problem are now substantially eliminated by the use of a material which is considerably less expensive than previous suggested materials.

We have described preferred embodiments of our invention. It will be apparent to many persons skilled in the art that modifications and substitutions can be made in the specific materials which have been mentioned. However, to do so will not depart from the spirit of this invention nor depart from the scope of the appended claims.

We claim:

1. A green molding sand composition consisting essentially of a mixture of from 85% to 97% silica sand, 3% to 15% clay, water and from about $\frac{1}{10}$% to 2% by weight of an additive consisting essentially of a combination of from about 80% to 50% of a first material selected from the group consisting of raw starches, modified starches and starch derivatives which are insoluble and non-adhesive in cold water and form gel structures in the presence of steam and hot water and from about 20% to 50% of a second material selected from the class consisting of cellulosic materials having a thin coating of a hydrocarbon wax, said hydrocarbon wax being present in the amount of about 10% by weight of said cellulosic materials.

2. A green molding sand composition consisting essentially of a mixture of from 85% to 97% silica sand, 3% to 15% clay, water and from about $\frac{1}{10}$% to 2% by weight of an additive consisting essentially of a combination of from about 80% to 50% of a first material selected from the group consisting of raw starches, modified starches and starch derivatives and mixtures thereof which are insoluble and non-adhesive in cold water and form gel structures in the presence of steam and hot water and from about 20% to 50% of a second material consisting of particulate cellulosic material having a thin coating of hydrocarbon wax on substantially all of the particles thereof, said hydrocarbon wax being present in the amount of about 10% by weight of said cellulosic materials.

3. A green molding sand composition consisting essentially of a mixture of from 85% to 97% silica sand, 3% to 15% clay, water and an additive consisting essentially of a combination of from about 80% to 50% of a first material selected from the group consisting of raw starches, modified starches and starch derivatives which are insoluble and non-adhesive in cold water and form gel structures in the presence of steam and hot water and from about 20% to 50% of a second material selected from the class consisting of cellulosic materials in an amount between $\frac{1}{10}$% to 2% by weight of said mixture having a thin coating of hydrocarbon wax, said hydrocarbon wax being present in the amount of about 10% by weight of said cellulosic materials.

4. A green molding sand composition consisting essentially of a mixture of from 85% to 97% silica sand, 3% to 15% clay, water and an additive consisting essentially of a combination of from about 80% to 50% of a first material selected from the group consisting of raw starches, modified starches and starch derivatives and mixtures thereof which are insoluble and non-adhesive in cold water and form gel structures in the presence of steam and hot water and from about 20% to 50% of a second material consisting of particulate cellulosic material having a thin coating of hydrocarbon wax on substantially all of the particles thereof in an amount between $\frac{1}{10}$% to 2% by weight of said mixture, said hydrocarbon wax being present in the amount of about 10% by weight of said cellulosic materials.

5. A green molding sand composition consisting essentially of a mixture of from 85% to 97% silica sand, 3% to 15% clay, water and an additive consisting essentially of a combination of from about 80% to 50% of a first material selected from the group consisting of raw starches, modified starches and starch derivatives which are insoluble and non-adhesive in cold water and form gel structures in the presence of steam and hot water and from about 20% to 50% of a second material selected from the class consisting of cellulosic materials having a thin coating of a hydrocarbon wax, said hydrocarbon wax being present in the amount of about 10% by weight of the cellulosic materials, said amount of said additive being substantially effective to prevent the surface of a mold made from said composition from rupturing when molten metal is poured into said mold.

6. A green molding sand composition consisting essentially of a mixture of silica sand, clay, water and an additive consisting essentially of a combination of a first material selected from the group consisting of raw starches, modified starches and starch derivatives which are insoluble and non-adhesive in cold water and form gel structures in the presence of steam and hot water and a second material selected from the class consisting of cellulosic materials having a thin coating of a hydrocarbon wax, said hydrocarbon wax being present in the amount of about 10% by weight of said cellulosic materials, said amount of said additive being substantially effective to prevent the surface of a mold made from said composition from rupturing when molten metal is poured into said mold.

References Cited in the file of this patent

UNITED STATES PATENTS

| | | |
|---|---|---|
| 1,711,136 | Brotz | Apr. 30, 1929 |
| 2,628,204 | Gray | Feb. 10, 1953 |
| 2,757,095 | Johnson | July 31, 1956 |
| 2,825,727 | Caldwell | Mar. 4, 1958 |
| 2,828,214 | Myers et al. | Mar. 25, 1958 |
| 2,884,333 | Karr et al. | Apr. 28, 1959 |
| 2,989,520 | Rutenberg | June 20, 1961 |

OTHER REFERENCES

Kerr: "Chemistry and Industry of Starch," 2nd edition (1950), Academic Press, New York City (pages 75, 674, 598).